(12) United States Patent
Kurosawa

(10) Patent No.: US 8,149,520 B2
(45) Date of Patent: Apr. 3, 2012

(54) ROTARY ACTUATOR FOR AUTO-FOCUSING A CAMERA LENS

(75) Inventor: Yuichi Kurosawa, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 161 days.

(21) Appl. No.: 12/488,651

(22) Filed: Jun. 22, 2009

(65) Prior Publication Data

US 2009/0323208 A1 Dec. 31, 2009

(30) Foreign Application Priority Data

Jun. 25, 2008 (JP) ................................. 2008-165499

(51) Int. Cl.
*G02B 15/14* (2006.01)
*H02K 41/03* (2006.01)

(52) U.S. Cl. ..... 359/698; 359/696; 359/699; 310/12.21; 310/12.22; 310/12.14; 310/154.21; 310/154.22; 310/180; 310/184; 310/181

(58) Field of Classification Search .................. 359/696, 359/689, 699; 310/154.21, 154.22, 154.25, 310/180, 181, 184, 266, 90.5, 12.21, 12.22, 310/12.24, 12.14, 156.43; *H02K 41/03*; *G02B 15/14*
See application file for complete search history.

(56) References Cited

U.S. PATENT DOCUMENTS

| | | | | |
|---|---|---|---|---|
| 4,390,307 A | * | 6/1983 | Rice | 405/228 |
| 5,079,460 A | * | 1/1992 | Vranish | 310/26 |
| 5,576,894 A | * | 11/1996 | Kuwana et al. | 359/701 |
| 5,719,451 A | | 2/1998 | Cook et al. | |
| 6,040,642 A | | 3/2000 | Ishiyama | |
| 6,252,317 B1 | * | 6/2001 | Scheffer et al. | 310/46 |
| 7,081,696 B2 | * | 7/2006 | Ritchey | 310/114 |
| 7,145,308 B1 | * | 12/2006 | Chase | 318/400.41 |
| 7,365,475 B2 | | 4/2008 | Kurosawa | |
| 7,382,072 B2 | * | 6/2008 | Erfourth | 310/156.09 |
| 7,454,135 B2 | | 11/2008 | Nakata et al. | |
| 7,608,964 B2 | * | 10/2009 | Yamagiwa | 310/156.32 |

(Continued)

FOREIGN PATENT DOCUMENTS

JP 9-502597 3/1997

(Continued)

OTHER PUBLICATIONS

Machine Translation of Nakada jp2006145783, Camera System having, Aug. 2006.*

(Continued)

*Primary Examiner* — Quyen Leung
*Assistant Examiner* — Terrance Kenerly

(57) ABSTRACT

A rotary actuator includes a multi-polar magnet, in which north and south poles are alternately arranged in a circumferential direction, the multi-polar magnet being shaped into one of a circular ring and a circular arc member; and a coil body having coils which are provided around the multi-polar magnet to be capable of moving in the circumferential direction of the multi-polar magnet, each of the coils substantially lying on a plane that extends in a radial direction of the multi-polar magnet and orthogonal to the circumferential direction of the multi-polar magnet. The north and south poles of the multi-polar magnet are positioned apart from each other by a predetermined interval in the circumferential direction. Dimensions of each coil are predetermined so that length of each coil in the circumferential direction is associated with the predetermined interval. Predetermined currents are passed through the coils in a properly phased manner.

13 Claims, 10 Drawing Sheets

U.S. PATENT DOCUMENTS

| | | |
|---|---|---|
| 2004/0106898 A1 | 6/2004 | Masunishi |
| 2006/0113856 A1* | 6/2006 | Tanno et al. ............. 310/156.37 |
| 2006/0113857 A1* | 6/2006 | Honkura et al. ......... 310/156.43 |
| 2006/0210265 A1 | 9/2006 | Adachi |
| 2007/0182266 A1* | 8/2007 | Nashiki et al. ................ 310/179 |
| 2008/0054731 A1* | 3/2008 | Tu et al. .......................... 310/12 |
| 2009/0110388 A1 | 4/2009 | Tsujiyama |
| 2009/0195087 A1 | 8/2009 | Kurosawa |
| 2009/0195878 A1 | 8/2009 | Kurosawa |

FOREIGN PATENT DOCUMENTS

| | | |
|---|---|---|
| JP | 10-313566 | 11/1998 |
| JP | 2006-145783 | 6/2006 |
| JP | 2006-259113 | 9/2006 |
| JP | 2007-116757 | 5/2007 |
| JP | 2007-282475 | 10/2007 |

OTHER PUBLICATIONS

English language Abstract of JP 9-502597, Mar. 11, 1997.
English language Abstract of JP 10-313566, Nov. 24, 1998.
English language Abstract of JP 2006-415783, Jun. 8, 2006.
English language Abstract of JP 2006-259113, Sep. 28, 2006.
English language Abstract of JP 2007-116757, May 10, 2007.
English language Abstract of JP 2007-282475, Oct. 25, 2007.

* cited by examiner

Fig. 9A
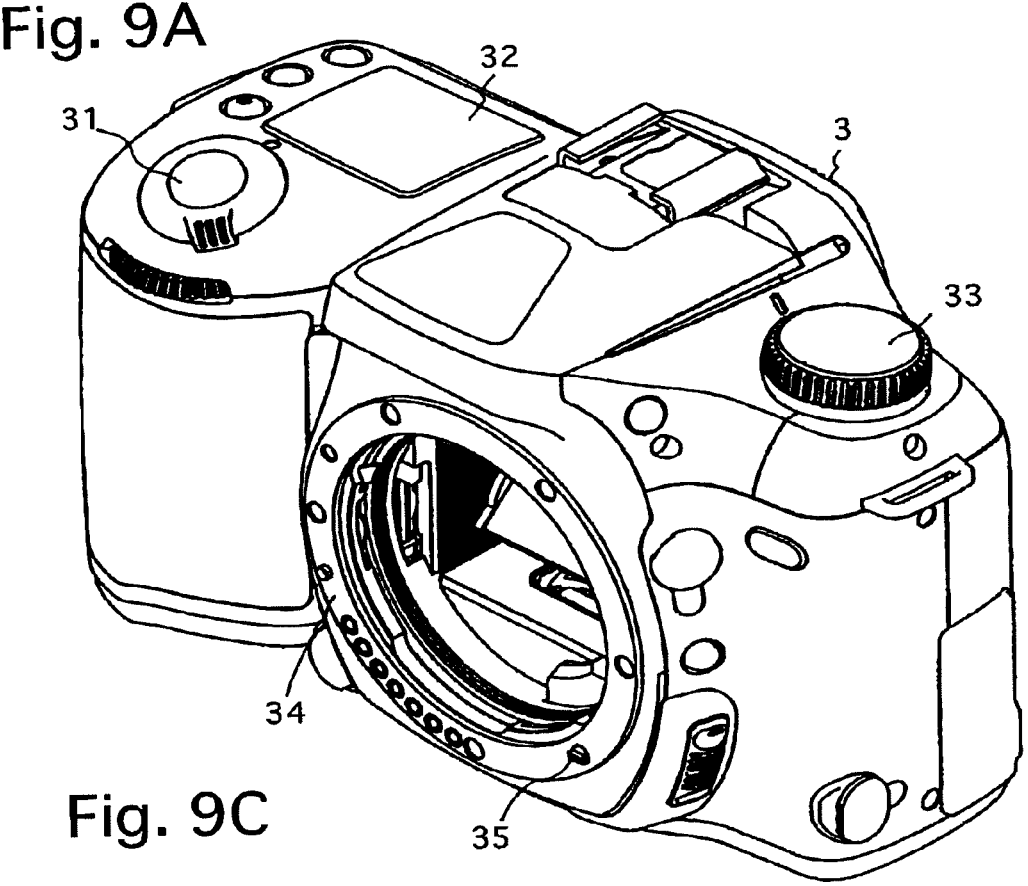
Fig. 9C
Fig. 9B
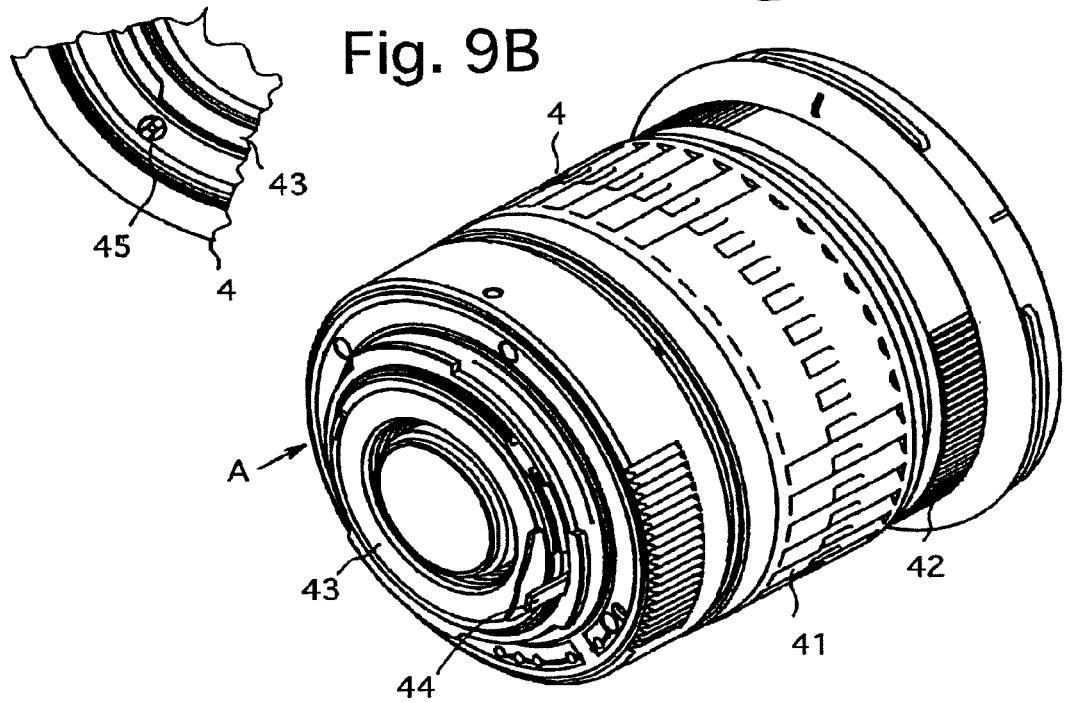

ROTARY ACTUATOR FOR AUTO-FOCUSING A CAMERA LENS

BACKGROUND OF THE INVENTION

1. Field of the Invention

The present invention relates to a rotary actuator which is composed of at least one magnet and at least one coil body and which performs a rotation operation with the use of magnetic force, and in particular relates to a rotary actuator which is incorporated in a camera lens and suitable for use as a drive source for an autofocus mechanism.

2. Description of the Related Art

DC motors are generally used as actuators for performing a rotation operation with the use of magnetic force. For instance, a DC motor is incorporated in an SLR camera lens to be used as a drive source for performing a lens driving operation when autofocus (AF) control is performed. For example, in Japanese Unexamined Patent Publication Nos. 2006-259113 and 2006-145783, a DC motor is incorporated in a camera body and another DC motor is incorporated in a photographic lens, and appropriate AF control is performed by appropriately switching operations of these DC motors. In addition, instead of using DC motors, the use of ultrasonic motors that can be designed small and light-weight as motors incorporated in a camera lens has been proposed in recent years. As this type of ultrasonic motor, the assignee of the present invention has proposed an ultrasonic motor that is disclosed in, e.g., Japanese Unexamined Patent Publication No. 2007-116757.

When AF control is performed in a photographic lens, normally a rotation of a focus cam ring relatively moves a focusing lens group linearly along the optical axis. A torque of a DC motor or an ultrasonic motor is used as a drive source for controlling rotation of this focus cam ring. However, in small DC motors and small ultrasonic motors, it is difficult to obtain a level of torque sufficient to (directly drive) rotate the focus cam ring, and accordingly, a reduction gear device is typically employed with the DC or ultrasonic motor so that torque of the motor is converted into high torque to be transferred to the focus cam ring via the reduction gear device. In addition, in the case of using an ultrasonic motor as a drive source (for controlling rotation of the focus cam ring), a high-voltage circuit is required to drive the ultrasonic motor; moreover, it is required to secure a space for installation of the high-voltage circuit. Therefore, the internal space of the photographic lens needs to accommodate both the reduction gear device and the high-voltage circuit, which has been an obstacle to miniaturization and a weight reduction of the photographic lens.

SUMMARY OF THE INVENTION

The present invention provides a rotary actuator which can be incorporated in a photographic lens of a camera to be used as a drive source for an AF mechanism, and which makes it possible to achieve miniaturization and a weight reduction of the photographic lens.

According to an aspect of the present invention, a rotary actuator is provided, including a multi-polar magnet, in which north and south poles are alternately arranged in a circumferential direction, the multi-polar magnet being shaped into one of a circular ring and a circular arc member, and a coil body having coils which are provided around the multi-polar magnet to be capable of moving in the circumferential direction of the multi-polar magnet, each of the coils substantially lying on a plane that extends in a radial direction of the multi-polar magnet and that is orthogonal to the circumferential direction of the multi-polar magnet. The north and south poles of the multi-polar magnet are positioned apart from each other by a predetermined interval in the circumferential direction. Dimensions of each coil are predetermined so that the length of each coil in the circumferential direction is associated with each predetermined interval. Predetermined currents are passed through the coils in a properly phased manner.

It is desirable for the coils to be positioned along the circumferential direction, and for each interval between the coils in the circumferential direction to equal to each interval between the north and south poles, of the multi-polar magnet, divided by an integer.

It is desirable for the multi-polar magnet to include a plurality of arc-shaped permanent magnets which are arranged in the circumferential direction to be formed into one of the circular ring and the circular arc member so that same poles of adjacent permanent magnets of the plurality of permanent magnets are circumferentially opposed. The plurality of arc-shaped permanent magnets are held integrally by a holder.

It is desirable for the multi-polar magnet to include an isotropic magnetic material having one of the circular ring shape and the circular arc shape which is magnetized to form north and south poles arranged alternately in the circumferential direction.

It is desirable for the coil body to include first, second and third coils which are arranged in the circumferential direction, timings of supplying currents to the first, second and third coils being controlled in properly phased manner.

It is desirable for the coil body to include at least two combinations of first, second and third coils which are arranged in the circumferential direction, timings of supplying currents to the first, second and third coils being controlled in properly phased manner.

It is desirable for lengths of the first, second and third coils to be mutually identical in the circumferential direction, and for the first, second and third coils to be arranged in the circumferential direction at equal intervals which are substantially equal to one third of the predetermined interval between the north and south poles of the multi-polar magnet.

It is desirable for the first, second and third coils to be connected in one of a Y-connection and a delta connection.

It is desirable for one and the other of the multi-polar magnet and the coil body to be configured to serve as one and the other of a stator and a mover.

It is desirable for the rotary actuator to be applied to a focusing mechanism for a photographic lens of a camera system, wherein one of the coil body and the multi-polar magnet is fixed to the photographic lens therein to be supported thereby while the other of the coil body and the multi-polar magnet is connected to a gearing ring which is geared to a focus ring of the photographic lens, wherein manually rotating the focus ring causes the gearing ring to rotate. The currents are passed through the coils in phased manner to control an auto focusing operation of the photographic lens.

It is desirable for the camera system to be configured so that a lens-side coupler of the photographic lens and a body-side coupler of a camera body of the camera system are coupled to each other when the photographic lens is attached to the camera body and that torque of a motor incorporated in the camera body is transmitted to the gearing ring via the lens-side coupler and the body-side coupler. The gearing ring is coupled to the lens-side coupler via the body-side coupler. A one-way clutch that is provided in the photographic lens transmits torque only in a direction from the lens-side coupler toward the gearing ring.

According to the present invention, a rotary actuator is achieved, in which torque in the circumferential direction is produced by magnetic force between the coil body and the multi-polar magnet by controlling currents supplied to the coil body. Accordingly, a reduction gear device becomes unnecessary, and miniaturization and a weight reduction of the actuator become possible. In addition, a high-voltage circuit for driving a motor such as an ultrasonic motor becomes unnecessary. Therefore, in the case where a rotary actuator according to the present invention is used as a drive source for an AF mechanism of a photographic lens, miniaturization of the AF mechanism becomes possible, so that miniaturization and a weight reduction of the photographic lens can be achieved.

The present disclosure relates to subject matter contained in Japanese Patent Application No. 2008-165499 (filed on Jun. 25, 2008) which is expressly incorporated herein by reference in its entirety.

BRIEF DESCRIPTION OF THE DRAWINGS

The present invention will be described below in detail with reference to the accompanying drawings in which:

FIGS. 9A and 9B show a front perspective view of a camera body of an SLR digital camera system and a rear perspective view of an interchangeable lens therefor, respectively, wherein one of the first through third embodiments of the rotary actuators is incorporated in the interchangeable lens as a drive source for an AF mechanism provided in the interchangeable lens;

FIG. 9C is an elevational view of a portion of the rear end of the interchangeable lens shown in FIG. 9B, viewed in the direction of the appended arrow A shown in FIG. 9B;

DESCRIPTION OF THE PREFERRED EMBODIMENTS

Figure 1A:
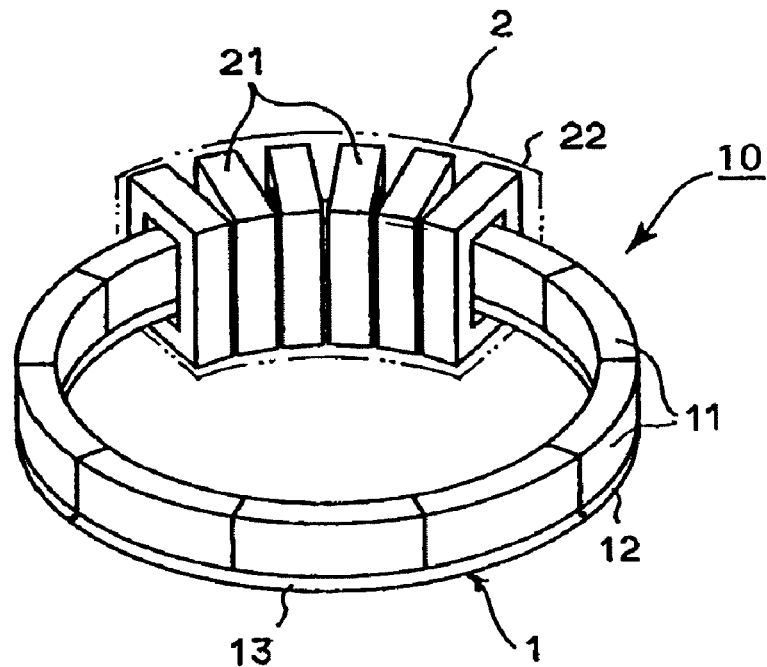
FIG. 1A is a top perspective view of a first embodiment of a rotary actuator, showing an outward appearance thereof.
Figure 1B:
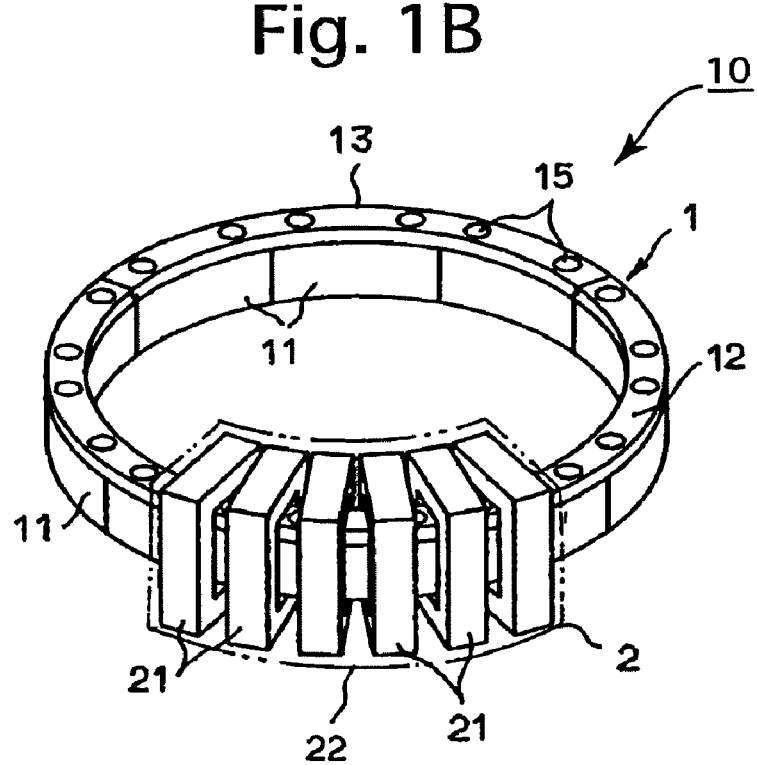
FIG. 1B is a bottom perspective view of the first embodiment of the rotary actuator, showing an outward appearance thereof.
Figure 2:
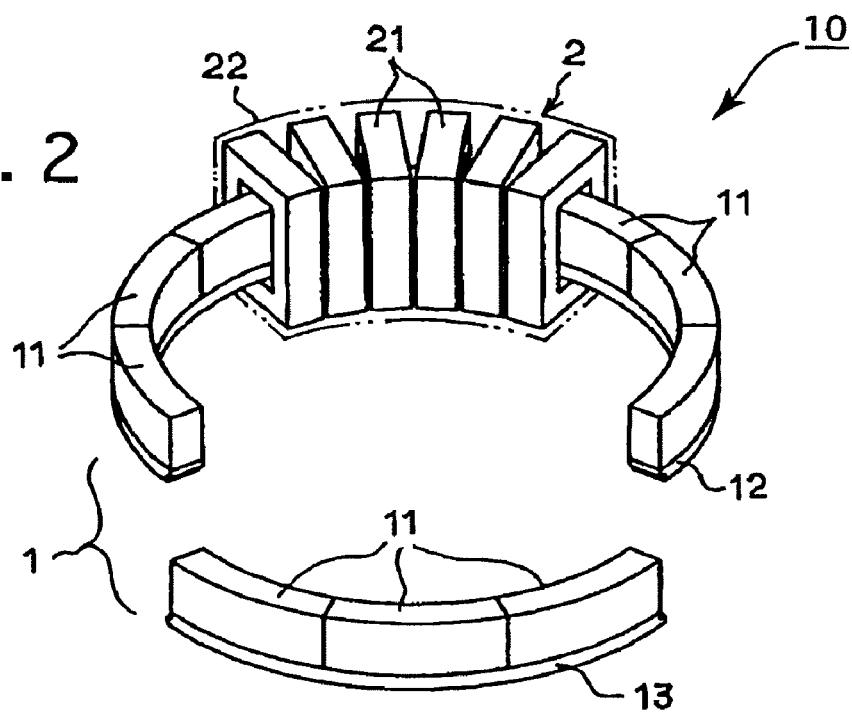
FIG. 2 is an exploded perspective view of the first embodiment of the rotary actuator, showing a state before the completion of assembly thereof.
Figure 3A:
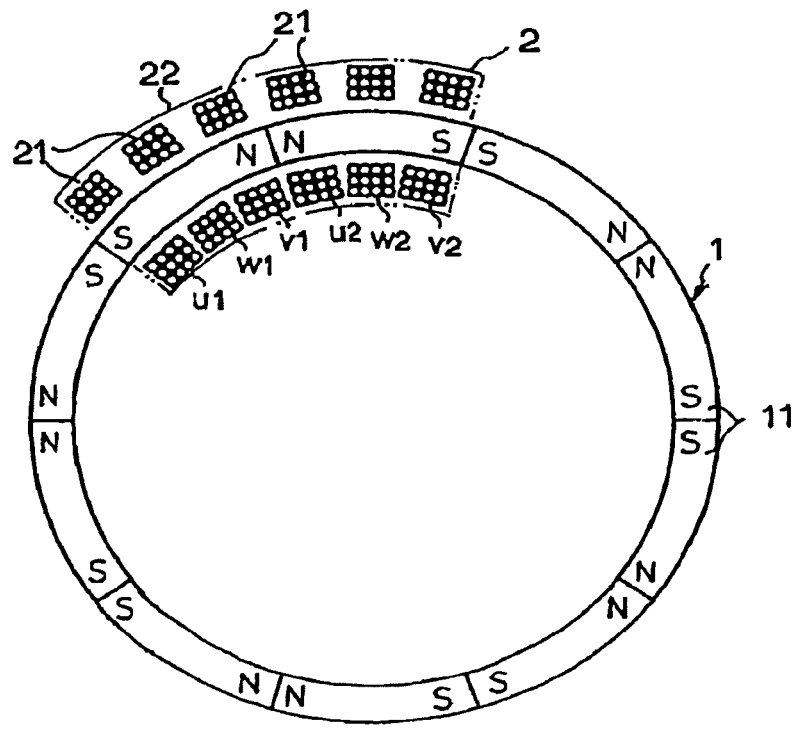
FIG. 3A is a schematic cross-sectional plan view of the first embodiment of the rotary actuator.
Figure 3B:
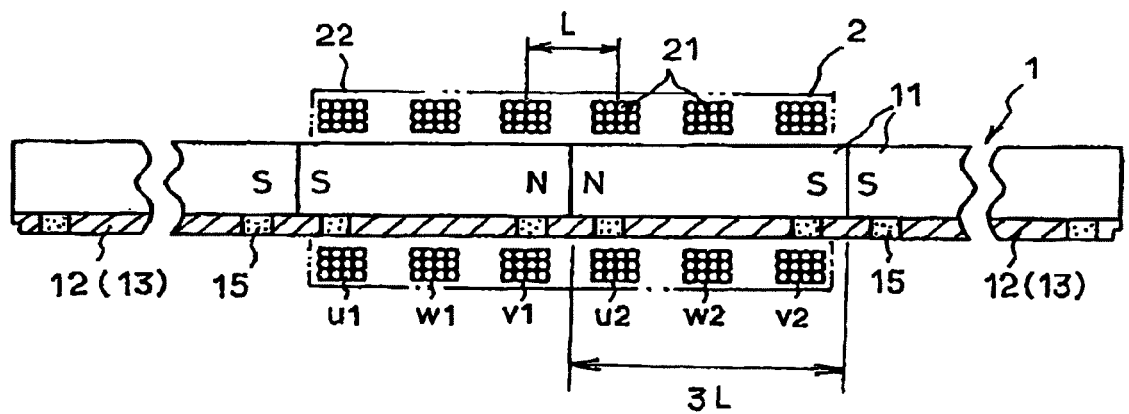
FIG. 3B is a schematic cross-sectional elevational view of the first embodiment of the rotary actuator.

FIGS. 1A and 1B are a top perspective view and a rear perspective view of a first embodiment of a rotary actuator. The rotary actuator 10 is composed of a multi-polar magnet 1 and a coil body 2 which serve as a stator and a mover, respectively. The multi-polar magnet 1 is shaped into a circular ring and has a rectangular cross-sectional shape. The coil body 2 is loosely fitted on the multi-polar magnet 1 to be movable in the circumferential direction of the multi-polar magnet 1. The multi-polar magnet 1 includes a plurality of circular-arc-shaped permanent magnets 11 which are arranged in a circle to form a circular ring. As shown in FIG. 2, seven permanent magnets 11 are bonded to one side of a circular-arc-shaped magnet holder 12, and three permanent magnets 11 are bonded to one side of another circular-arc-shaped magnet holder 13. Each of the circular-arc-shaped magnet holder 12 and the circular-arc-shaped magnet holder 13 is made of a non-magnetic material, and the circular-arc-shaped magnet holder 12 is greater in arcuate length than the circular-arc-shaped magnet holder 13. Thereafter, the two circular-arc-shaped magnet holders 12 and 13 are joined together circumferentially to form a circular ring. In this assembling operation, the plurality of permanent magnets 11 are arranged so that the magnetic poles of the circumferentially-opposed ends of adjacent permanent magnets become the same (north or south pole) as shown in FIGS. 3A and 3B that show a schematic cross-sectional plan view and a schematic cross-sectional elevational view of the multi-polar magnet 1, respectively. Due to this arrangement, the multi-polar magnet 1 is structured so that the circumferentially-opposed N-poles and the circumferentially-opposed S-poles are alternately arranged in the circumferential direction of the multi-polar magnet 1 at required intervals (pitch). In each permanent magnet 11 of the multi-polar magnet 1, magnetic lines of force exit from the N-pole of the permanent magnet 11 and curve around toward the S-pole thereof to enter the S-pole, wherein the magnet field thereof is defined between a plane lying on the axis of rotation (revolution) of the coil body 2 and passing through the N-pole and a plane lying on the axis of rotation (revolution) of the coil body 2 and passing through the S-pole. In the present embodiment of the rotary actuator 10, through holes 14 are formed in each of the magnet holders 12 and 13 in the direction of the thickness thereof so as to constitute a structure for bonding the plurality of permanent magnets 11 to the two magnet holders 12 and 13, and an adhesive 15 is filled in each through hole 14 to bond the plurality of permanent magnets 11 to the two magnet holders 12 and 13. In addition, the two magnet holders 12 and 13 are bonded to each other by an adhesive when joined together in a circle during assembly thereof.

The coil body 2 that serves as a mover has a structure such that a plurality of coils 21 are arranged in a circumferential direction and supported by a coil holder 22 which is shaped like an arc-shaped rectangular tube, as shown by two-dot chain lines shown in FIGS. 1A and 1B. Each coil 21 is wound into a substantially rectangular shape so that the rectangular cross-sectional shape of each coil 21 lies in a plane extending in a radial direction of the multi-polar magnet 1. The coils 21 are arranged in a circumferential direction of the multi-polar magnet 1 at a predetermined pitch (equi-angular intervals).

During an assembly operation, the coil body 2 is fitted on the magnet holder 12 from either end thereof before the two magnet holders 12 and 13 are bonded to each other. For the sake of convenience, in the present embodiment of the rotary actuator 10, the plurality of coils 21 are indicated as six independent coils u (u1 and u2), w (w1 and w2), and v (v1 and v2), which are arranged in the circumferential direction and integrally supported by the coil holder 22. In FIG. 3B, "L" designates the pitch of the coils u, w and v (first, second and third coils) in the circumferential direction and is predetermined to be equal to one third of the circumferential length 3L of each permanent magnet 11. In other words, the pitch L is predetermined to be equal to one third of the pitch (=3L) of the north and south poles of the multi-polar magnet 1 in the circumferential direction. In addition, it can be understood from this structure that the width of each coil 21 in the circumferential direction is, of course, smaller than the pitch L of the independent coils u, w and v in the circumferential direction.

Figure 4A:
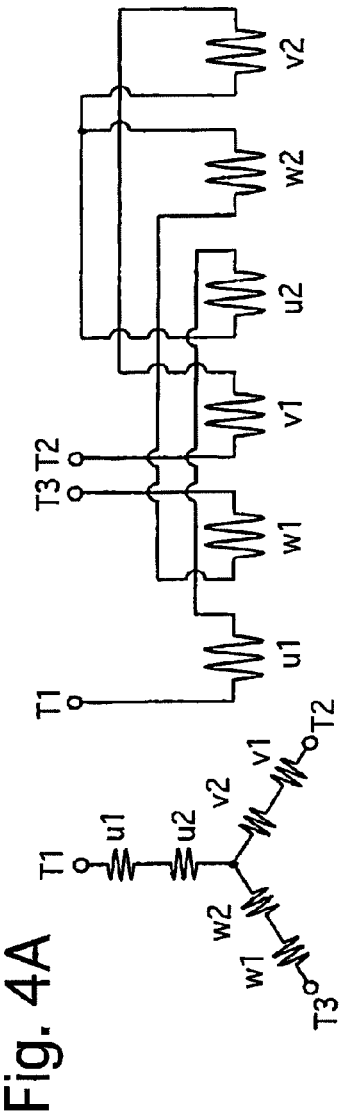
FIG. 4A is a connection diagram of a coil body of the first embodiment of the rotary actuator.

As shown in FIG. 4A, the coils u1 and u2 are connected in series, the coils w1 and w2 are connected in series, and the coils v1 and v2 are connected in series, and thereafter, one end of each of these three pairs of coils are connected coalescently in a Y-connection, while the other ends of the three pairs of coils, which constitute three electrode terminals T1, T2 and T3, are connected to a power source for driving the rotary actuator 10 via a controller (not shown). This controller operates to pass a current of positive or negative polarity through each coil 21 (i.e., controls the direction of the current that passes through each coil u, w and v) according to timings (driving patterns) t1 through t6 as one cycle as shown in FIG. 4B.

Figure 4B:
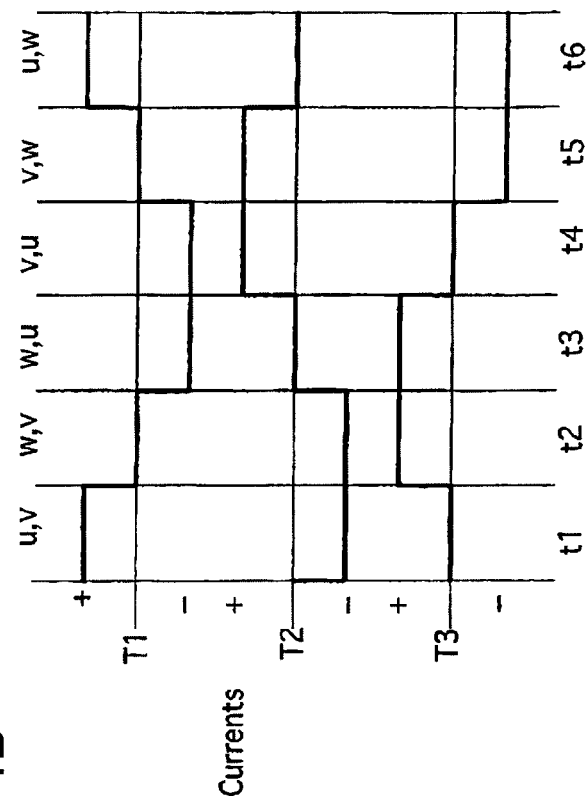
FIG. 4B is a timing chart illustrating changes of current flows in the coil body.

According to the first embodiment of the rotary actuator 10, upon currents being passed through the electrode terminals T1, T2 and T3 at the timing t1 shown in FIG. 4B when the coil body 2 is in the position shown in FIGS. 3A and 3B, currents are passed only through the four coils u1, u2, v2 and v1, so that a driving force urging the coil to move in the rightward direction with respect to FIGS. 3A and 3B is created at each of the four coils u1, u2, v2 and v1 due to the direction of the current passed through each of the these coils and the magnetic fields of the associated north and south poles of the multi-polar magnet 1 according to Fleming's left hand rule. Consequently, the coils 21, i.e., the coil body 2 moves circumferentially rightward with respect to FIGS. 3A and 3B by a distance corresponding to the pitch L.

Subsequently, upon currents being passed through the electrode terminals T1, T2 and T3 at the timing t2 shown in FIG. 4B, currents are passed only through the four coils w1, w2, v2 and v1, so that a driving force urging the coil to move in the rightward direction with respect to FIGS. 3A and 3B is created at each of the four coils w1, w2, v2 and v1 due to the direction of the current passed through each of the these coils and the magnetic field of the associated south and north pole of the multi-polar magnet 1 according to Fleming's left hand rule. Consequently, the coil body 2 further moves circumferentially rightward with respect to FIGS. 3A and 3B by a distance corresponding to the pitch L.

Subsequently, upon currents being passed through the electrode terminals T1, T2 and T3 at the timing t3 shown in FIG. 4B, currents are passed only through the four coils w1, w2, u2 and u1, so that a driving force urging the coil to move in the rightward direction with respect to FIGS. 3A and 3B is created at each of the four coils w1, w2, u2 and u1 due to the direction of the current passed through each of the these coils and the magnetic field of the associated south and north pole of the multi-polar magnet 1 according to Fleming's left hand rule. Consequently, the coil body 2 further moves circumferentially rightward with respect to FIGS. 3A and 3B by a distance corresponding to the pitch L.

Consequently, due to this half-cycle current control, the coil body 2 has moved rightward in the circumferential direction with respect to FIGS. 3A and 3B by a distance corresponding to three times of the pitch L. Subsequently, in a similar manner, the coil body 2 moves rightward in the circumferential direction by a distance corresponding to six times of the pitch L with respect to FIGS. 3A and 3B in one cycle from the timing t1 to the timing t6. If the current passage is controlled in the reverse direction from the timing t6 toward the timing t1 in FIG. 4B, the coil body 2 moves leftward in the circumferential direction, i.e., in the opposite circumferential direction to the above, by a distance corresponding to six times of the pitch L with respect to FIGS. 3A and 3B in one cycle of current control. Accordingly, the coil body 2 can be controlled so that it moves forward and reverse in the circumferential direction along the multi-polar magnet 1, so as to constitute the rotary actuator 10.

The first embodiment of the rotary actuator 10 can be made extremely simple in structure and can also be made compact and lightweight because the rotary actuator 10 is composed of only the circular-ring-shaped multi-polar magnet 1 and the coil body 2 that is loosely fitted on the multi-polar magnet 1. Additionally, the coil body 2 can be rotated along the multi-polar magnet 1 by controlling the currents passed through the plurality of coils 21 of the coil body 2. Moreover, the amount of rotation of the coil body 2 can be controlled by the number of driving patterns of the currents passing through the plurality of coils 21, the rotational speed of the coil body 2 can be controlled by controlling the interval at which the driving patterns are switched to a subsequent driving pattern, and torque of the coil body 2 can be controlled by the quantity of current supplied to the plurality of coils 21, and accordingly, the rotary actuator 10 can be used as a rotary actuator which meets rotation conditions required by an associated apparatus.

Embodiment 2

Figure 5:
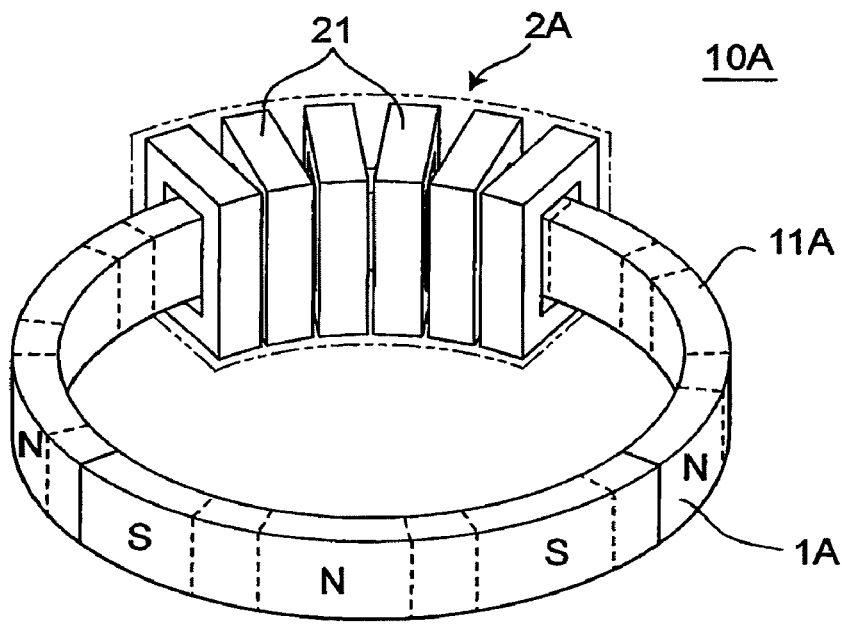
FIG. 5 is a top perspective view of a second embodiment of the rotary actuator, showing an outward appearance thereof.
Figure 6:
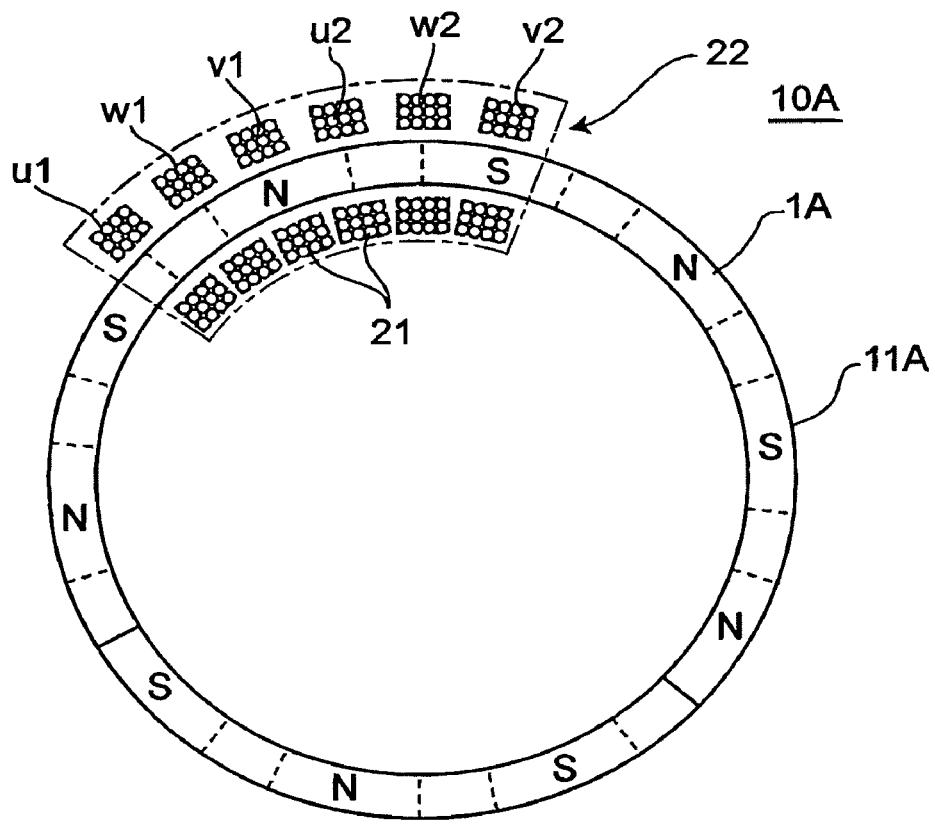
FIG. 6 is a schematic cross-sectional plan view of the second embodiment of the rotary actuator.

As shown in FIGS. 5 and 6, in the second embodiment of the rotary actuator 10A, a multi-polar magnet 1A thereof serving as a stator (which corresponds to the multi-polar magnet 1 of the rotary actuator 10) includes a plurality of (two) circular-arc-shaped pieces 11A and 11B made of an isotropic magnetic material which are arranged and fixed in a circle to form a circular ring with north and south poles of magnetized pieces of the plurality of circular-arc-shaped pieces 11A, 11B being alternately arranged at regular intervals. Additionally, in a similar manner to that in the first embodiment of the rotary actuator, a coil body 2A, which is a integral combination of the plurality of coils 21 and the coil holder 22, is loosely fitted on the multi-polar magnet 1A. FIG. 6 is a schematic cross-sectional plan view of the second embodiment of the rotary actuator. In the multi-pole magnetized type of multi-polar magnet 1A, although each south-pole or north-pole magnetized portion thereof is great in magnetic force, intermediate portions between north and south poles are small in magnetic force, thus not substantially functioning as magnetic poles. Accordingly, the structure of the multi-polar magnet 1A is substantially the same as the structure of the multi-polar magnet 1 of the first embodiment of the rotary actuator 10, in which a plurality of south poles and a plurality of north poles are alternately arranged at a predetermined pitch in the circumferential direction. In the second embodiment of the rotary actuator 10A also, in a similar manner to that in the first embodiment of the rotary actuator 10, it is possible for two arc-shaped multi-polar magnets having different circumferential lengths to be made from an isotropic magnetic material and for the multi-polar magnet in the shape of a circular ring to be made by connecting these two arc-shaped multi-polar magnets to each other circumferentially by, e.g., adhesive, and the rotary actuator 10A can be assembled by fitting the coil body 2A on either of the two arc-shaped multi-polar magnets before the two arc-shaped multi-polar magnets are bonded to each other.

In this manner, in the second embodiment of the rotary actuator, since the multi-polar magnet 1A as a stator is formed by being magnetized to form north and south poles arranged alternately in the circumferential direction through the adoption of the circular-arc-shaped pieces 11A and 11B made of an isotropic magnetic material, it is not necessary to mechanically connect a plurality of permanent magnets, which are magnetized independently of each other, to one another with the use of magnet holders, so that the rotary actuator does not have to be provided with any magnetic holder. Therefore, the (two) circular-arc-shaped magnet groups (of the circular-arc-shaped pieces 11A and 11B) bond to each other, which makes it possible to reduce the number of elements of the rotary actuator, to produce the rotary actuator at low cost, and to achieve miniaturization and a weight reduction of the rotary actuator. In addition, in the production of the multi-polar magnet 1A that is structured in the above described manner, the multi-polar magnet 1A can be formed so that the south-pole and north-pole magnetized portions that are arranged in the circumferential direction can be arranged at any given pitch with any given circumferential length by magnetizing the circular-arc-shaped pieces 11A and 11B of an isotropic magnetic material at the given pitch. With this structure, by freely designing the magnetized portions and the pitch thereof, it is also possible to achieve the rotary actuator 10A in which the moving pitch of the coil body 2A can be freely designed.

In the second embodiment of the rotary actuator 10A also, the coil body 2A can be controlled so that it moves forward and reverse in the circumferential direction along the multi-polar magnet 1A by connecting the coils u1, u2, w1, w2, v1 and v2 in a similar manner to that of the first embodiment of the rotary actuator 10 as shown in FIG. 4A and controlling the current passed through each coil 21, which makes the configuration of the rotary actuator 10A possible.

Figure 7A:
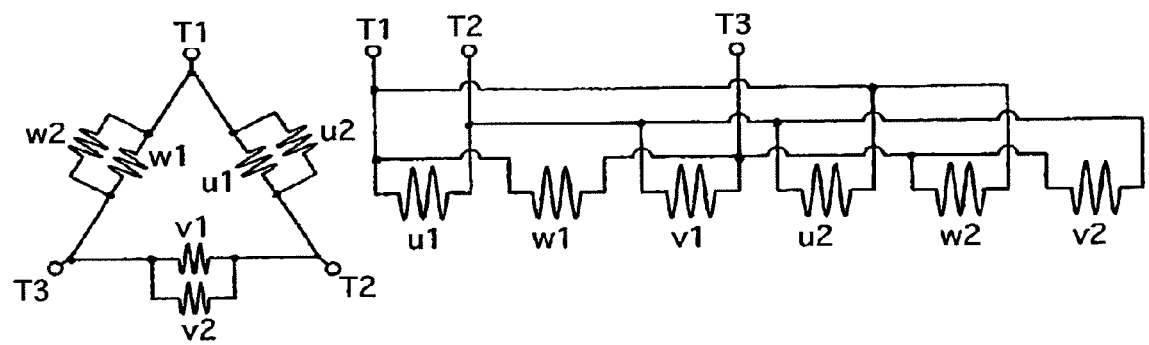
FIG. 7A is a connection diagram of a coil body of the second embodiment of the rotary actuator.
Figure 7B:
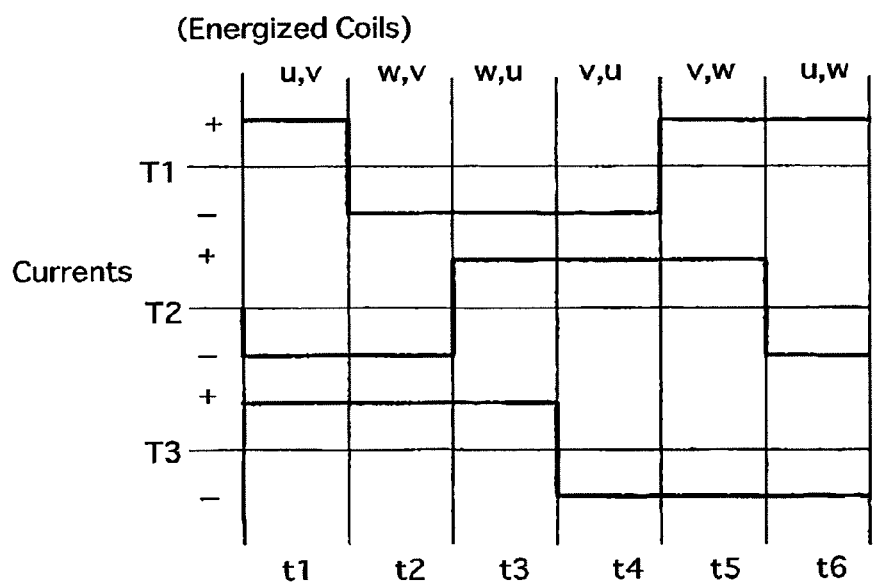
FIG. 7B is a timing chart illustrating changes of current flows in the coil body in the second embodiment of the rotary actuator.

In each of the above described first and second embodiments of the rotary actuators, in regard to the six coils 21 that constitute the coil body 2A, the three electrode terminals T1, T2 and T3 can be connected to a power source for driving the rotary actuator 10 (10A) via a controller (not shown) after the six coils 21 are connected in delta with one ends and the other ends of each pair of coils u1 and u2, w1 and w2 and v1 and v2 being connected in a ring, as shown in FIG. 7A. In this case also, by passing a current of positive or negative polarity through each coil according to timings t1 through t6 as one cycle as shown in FIG. 7B, the coil body 2A can be controlled so that it moves rightward or leftward in the circumferential direction by a distance corresponding to six times of the pitch L in one cycle of current control.

The number of coils 21 that are elements of the coil body 2A is not limited to the specific number (six) in each of the above described first through third embodiments of the rotary actuators. For instance, it is possible for the number of coils of the coil body 2A to be three (i.e., a u-coil, a w-coil, and a v-coil), nine (i.e., three u-coils, three w-coils and three v-coils), or any other multiple of three. In this case, the pitch of the plurality of coils of the coil body in the circumferential direction can be set to correspond to the pitch of the north and south poles of the multi-polar magnet.

Embodiment 3

In each of the first and second embodiments of the rotary actuators, the multi-polar magnet can make the coil body 2 (2A or 2B) that serves as a mover rotate through the circumference of the multi-polar magnet (360 degrees) since the multi-polar magnet is shaped into a circular ring. Namely, the multi-polar magnet can make the coil body 2 (2A or 2B) rotate infinite times; however, in the case where the rotary actuator is configured so that the mover (coil body) only needs to be rotatable within an angular rotation range smaller than 360 degrees, the multi-polar magnet can be formed into an arc shape (i.e., does not have to be formed into a circular ring).

Figure 8:
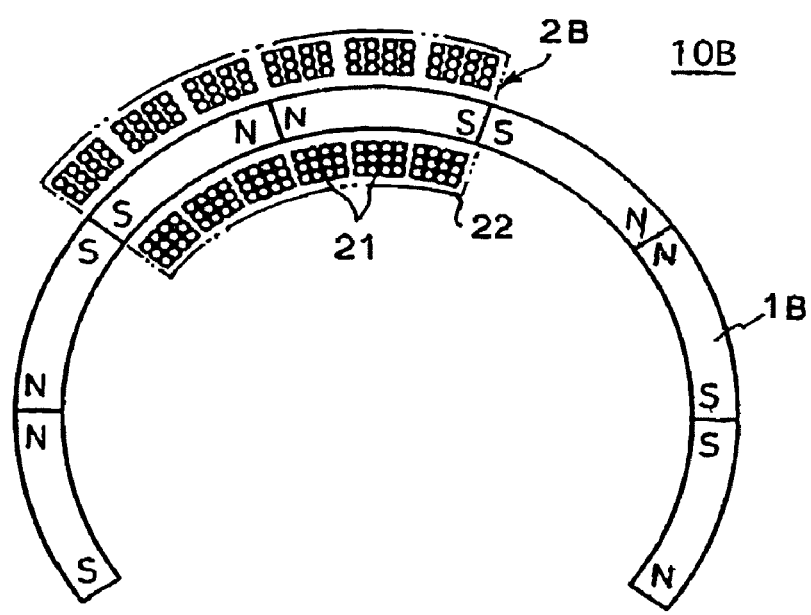
FIG. 8 is a schematic cross-sectional plan view of a third embodiment which is a modified embodiment of the first and second embodiments of the rotary actuators.

For instance, as shown in FIG. 8 that shows a third embodiment of a rotary actuator 10B, a multi-polar magnet 1B of the rotary actuator 10B is formed into an arc shape (C-shape) and does not form a complete circle, so that the coil body 2B reciprocally moves only within the range of the multi-polar magnet 1B in the circumferential direction. In this case, a magnet holder used for holding all the permanent magnets of the multi-polar magnet 1B can be made as a single circular arc-shaped magnet holder. Similarly, the multi-polar magnet 1A can be modified into a circular-arc-shaped multi-polar magnet in the second embodiment of the rotary actuator. In this case, a circular-arc-shaped piece made of an isotropic magnetic material can be used. In addition, as shown by a two-dot chain line in FIG. 8, the efficiency of production of the driving force relative to the magnetic fields created by the magnetic poles of the multi-polar magnet can be enhanced by adjusting the dimensions of each wound coil 21 in a coil body 2B of the rotary actuator 10B so as to form each coil 21 into a fan shape in a lateral cross section.

Although the multi-polar magnet and the coil body serve as a stator and a mover, respectively, in each of the first through third embodiments of the rotary actuators, it is possible that the coil body be configured to serve as a stator while the multi-polar magnet be configured to serve as a mover which is moved in a circumferential direction (rotated) relative to the coil body. Since the coil body needs to be connected to a power source to pass currents through the coil body, it is desirable that the multi-polar magnet be configured to serve as a mover because the multi-polar magnet does not have to be connected to a power source in the case of designing a type of rotary actuator in which the mover is rotated over the circumference of the rotary actuator. In addition, the number of coils of the coil body in the rotary actuator according to the present invention only needs to be one or any other positive integer of more than one, and the rotary actuator can be achieved so long as each interval between the coils of the coil body in the circumferential direction is equal to each interval between the north and south poles, of the multi-polar magnet, divided by an integer.

FIGS. 9A and 9B show a camera body 3 and an interchangeable lens 4 of an SLR digital camera system in which one of the first through third embodiments of the rotary actuators is incorporated in the interchangeable lens 4 as a drive source for an AF mechanism provided in the interchangeable lens 4. FIGS. 9A and 9B show a front perspective view of the camera body 3 and a rear perspective view of the interchangeable lens 4, and FIG. 9C is an elevational view of a portion of the rear end of the interchangeable lens 4, viewed in the direction of the appended arrow A shown in FIG. 9B. The camera body 3 is provided with a release button 31, an LCD indicator 32 and a mode select dial 33. The camera body 3 is provided on the front thereof with a lens mount 34 to which the interchangeable lens 4 is detachably attached. The camera body 3 is provided on a part of the lens mount 34 with a body-side AF coupler 35 which is coupled to a lens-side AF coupler 45 (see FIG. 9C) of the interchangeable lens 4 when the interchangeable lens 4 is attached to the camera body 3. The interchangeable lens 4 is provided along the outer periphery thereof with a zoom ring 41 and a focus ring 42 which are coaxially arranged side by side in the axial direction of the interchangeable lens 4, and which are manually operated to adjust the focal length and the focus point, respectively. The interchangeable lens 4 is provided at the rear end thereof with a bayonet mount portion 43 which is brought into engagement with the lens mount 34 of the camera body 3 to attach the interchangeable lens 4 to the camera body 3. The interchangeable lens 4 is provided, in association with the bayonet mount portion 43, with a diaphragm control bar 44, the rear end of which projects rearward from the bayonet mount portion 43 as shown in FIG. 9B. The diaphragm control bar 44 is for operating a diaphragm mechanism provided in the interchangeable lens 4. The aforementioned AF coupler 45, which is coupled to the AF coupler 35 of the camera body 3 when the interchangeable lens 4 is attached to the camera body 3, is exposed outwardly from the bayonet mount portion 43.

In the camera system shown in FIGS. 9A and 9B, the camera body 3 is provided therein with an in-body AF mechanism for performing a focusing operation on an object which is to be photographed, and a DC motor as a power source for the in-body AF mechanism (the in-body AF mechanism and the power source therefor are not shown in the drawings, and the detailed descriptions thereof are omitted from the following descriptions). When the DC motor is driven to rotate to perform AF control in an autofocusing operation at a time of exposure in a state where the bayonet mount portion 43 of the interchangeable lens 4 is mounted to the lens mount 34 of the camera body 3, the body-side AF coupler 35 is rotated on the axis thereof by this rotation of the DC motor, and this rotation of the body-side AF coupler 35 causes also the lens-side AF coupler 45, which is coupled to the body-side AF coupler 35, to rotate on the axis of the lens-side AF coupler 45. This rotation of the lens-side AF coupler 45 causes an in-lens AF mechanism (not shown) of the interchangeable lens 4 that is associated with the lens-side AF coupler 45 to operate, thus causing a focusing lens group in the interchangeable lens 4 to move to perform AF control.

Figure 10A:
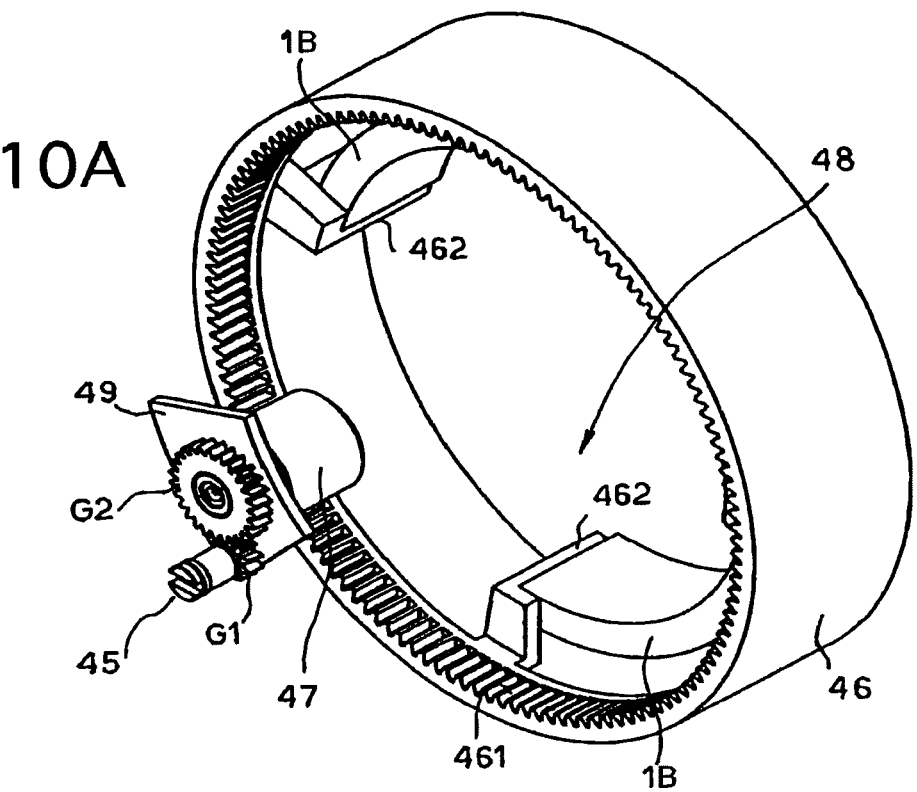
FIG. 10A is a rear perspective view of the AF mechanism of the interchangeable lens shown in FIG. 9B.
Figure 10B:
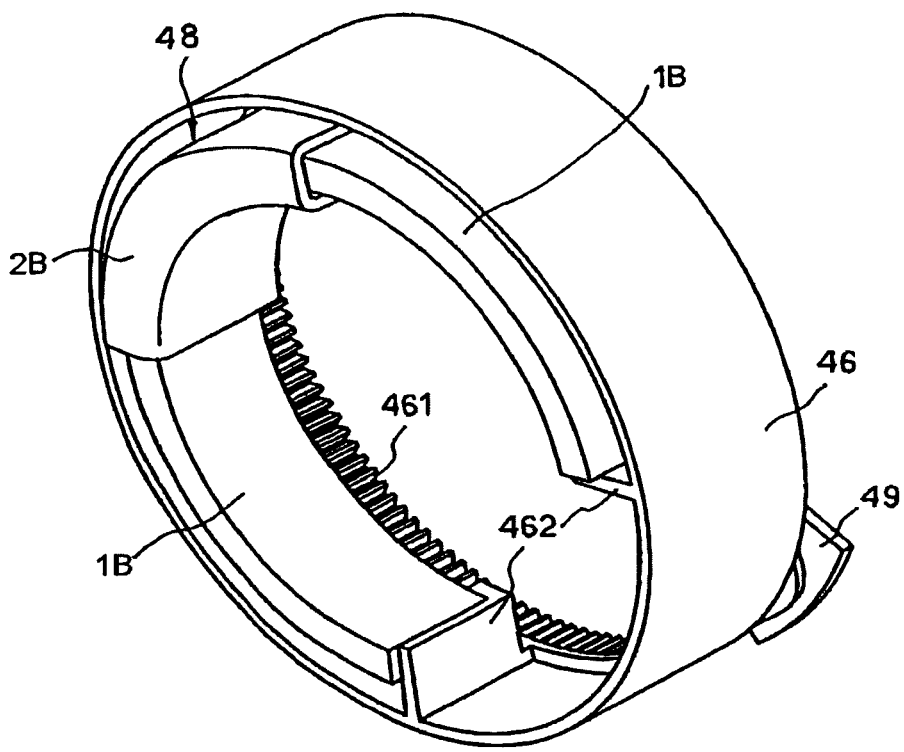
FIG. 10B is a front perspective view of the AF mechanism of the interchangeable lens shown in FIG. 9B.

FIGS. 10A and 10B are a rear perspective view and a front perspective view of a portion of the AF mechanism of the interchangeable lens 4, respectively. The in-lens AF mechanism of the interchangeable lens 4 is provided with a gearing ring 46 which is geared to the focus ring 42 that is shown in FIG. 9. Manually rotating the focus ring 42 causes the gearing ring 46 to rotate, and this rotation of the gearing ring 46 causes a focus cam ring (not shown) in the interchangeable lens 4 to rotate about an optical axis, and this rotation of the focus cam ring causes the focusing lens group to move in the optical axis direction to bring an object into focus. An inner gear (circumferential gear) 461 is formed integral with an inner peripheral surface of the gearing ring 46. The inner gear 461 is in mesh with a quick focus clutch (one-way clutch) 47 (see FIG. 10A). The inner gear 461 is further geared to the lens-side AF coupler 45 via the quick focus clutch 47.

Any one of the above described first through third embodiments of the rotary actuators can be installed in the gearing ring 46. In this particular embodiment of the camera system, the third embodiment of the rotary actuator 10, which is composed of the multi-polar magnet 1B as a mover and the coil body 2B as a stator, is installed to the gearing ring 46 as a rotary actuator 48. The multi-polar magnet 1B is formed into a circular-arc shape (C-shape) to correspond to the angular rotation range required for the gearing ring 46 to rotate therethrough. The gearing ring 46 is provided, on an inner peripheral surface thereof at two different positions thereon, with two fixing projections 462 which project radially inwards, and the multi-polar magnet 1B is fixed to the gearing ring 46 with both ends of the multi-polar magnet 1B abutting against the two fixing projections 462 in the circumferential direction to be held therebetween, respectively, so that the multi-polar magnet 1B rotates integrally with the gearing ring 46. In addition, the coil body 2B which is loosely fitted on the multi-polar magnet 1B is fixed to a stationary portion of a stationary barrel member (not shown) of the interchangeable lens 4. Accordingly, the multi-polar magnet 1B is moved in the circumferential direction within the arc-shaped range thereof by controlling currents passed through the coil body 2B in the rotary actuator 48, and this movement of the multi-polar magnet 1B causes also the gearing ring 46 to move with the multi-polar magnet 1B in the circumferential direction, thus causing the focusing lens group in the interchangeable lens 4 to move to perform AF control as described above.

Figure 11:
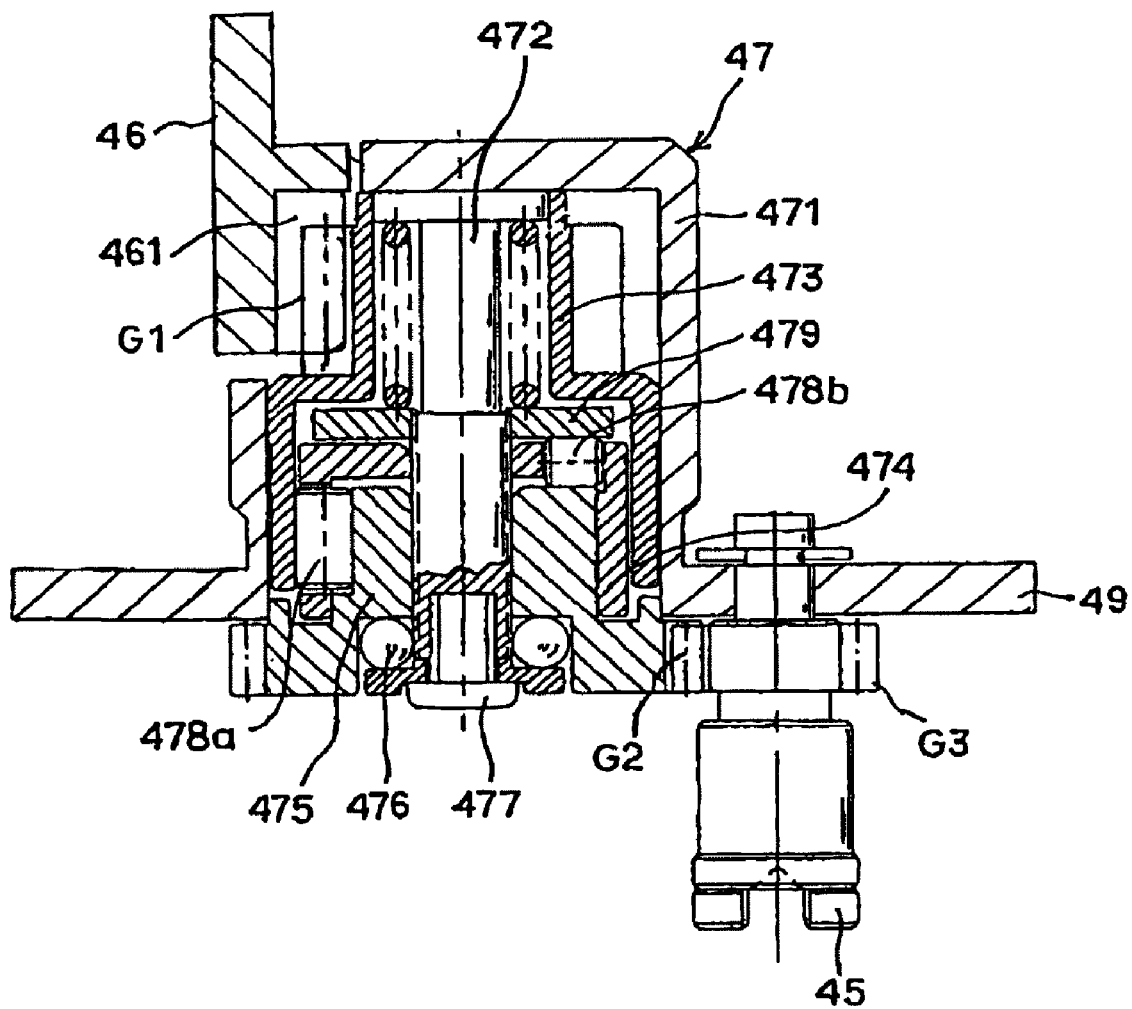
FIG. 11 is a cross sectional view of a quick focus clutch shown in FIG. 10A.

The quick focus clutch 47 is almost the same as the clutch disclosed as a one-way rotational transfer mechanism in Japanese Unexamined Patent Publication No. 2006-145783. As shown in FIG. 11, the quick focus clutch 47 is provided with a housing 471 which is formed into the shape of a substantially hollow-cylindrical container as part of a base plate 49 that is fixed to a stationary member of the interchangeable lens 4. The quick focus clutch 47 is provided with a clutch shaft 472 which is positioned inside the housing 471 and fixed thereto. The quick focus clutch 47 is provided in the housing 471 with a hollow-cylindrical rotary output shaft 473 which is concentrically positioned around the clutch shaft 472, and is further provided inside the hollow-cylindrical rotary output shaft 473 with a retainer 474 in the shape of a hollow-cylindrical container. In addition, the quick focus clutch 47 is provided, inside the retainer 474 concentrically therewith, with a cam body 475 which is formed into a column shape so that the shape of a cross section thereof taken along a plane orthogonal to the axis of the clutch shaft 472 is substantially petal shaped. The hollow-cylindrical rotary output shaft 473 is provided, on the outer periphery of one end (upper end with respect to FIG. 11) of the hollow-cylindrical rotary output shaft 473, with an output gear G1 which is formed integral with the hollow-cylindrical rotary output shaft 473. The output gear G1 is in mesh with the inner gear 461 of the gearing ring 46 through a cutout formed in a part of the housing 471. The other end (lower end with respect to FIG. 11) of the hollow-cylindrical rotary output shaft 473 is elongated to a position so as to surround the outer periphery of the cam body 475. The cam body 475 is prevented from coming off the clutch shaft 472 by balls 476 and a set screw 477 while being allowed to rotate relative to the clutch shaft 472, and a plurality of peripheral surface rollers 478a are installed at different positions on the outer periphery of the cam body 475 between the outer periphery of the cam body 475 and the inner periphery of the hollow-cylindrical rotary output shaft 473. In addition, a plurality of end-face rollers 478b are installed between a disk-shaped retaining plate 479 that passes through the clutch shaft 472 and the upper end surface of the cam body 475. Additionally, a cam gear G2 is formed integral with the lower end of the cam body 475 to be engaged with a gear G3 which is formed integral with the lens-side AF coupler 45, which is supported by the base plate 49 to be rotatable on the axis of the lens-side coupler 45.

In the quick focus clutch 47, the cam body 475 is rotated due to the engagement of the gear G3 with the gear G2 upon the lens-side AF coupler 45 being rotated on the axis thereof. This rotation of the cam body 475 causes each peripheral surface roller 478a, which is positioned on the outer periphery of the cam body 475, to move in the circumferential direction opposite to the rotational direction of the cam body 475 due to friction between the peripheral surface roller 478a and the inner periphery of the hollow-cylindrical rotary output shaft 473. During this movement, the retainer 474 is allowed to rotate relative to the cam body 475 by the plurality of end-face rollers 478b. When moved in the circumferential direction about the axis of the cam body 475, each peripheral surface roller 478a moves into one of wedge-shaped opposite ends in the associated accommodation space between the associated inner peripheral surface of the hollow-cylindrical rotary output shaft 473 and the associated outer peripheral surface of the cam body 475, and comes into firm contact with the associated outer peripheral surface of the cam body 475 so that the cam body 475 and the hollow-cylindrical rotary output shaft 473 become integral with each other in the rotational direction. Due to this integral relationship between the cam body 475 and the hollow-cylindrical rotary output shaft 473, rotation of the cam body 475 is transferred to the hollow-cylindrical rotary output shaft 473 so that the gearing ring 46 rotates due to the engagement of the gear G1 of the hollow-cylindrical rotary output shaft 473 with the inner gear 461. In either case where the cam body 475 is rotated forwardly or reversely, i.e., where the lens-side AF coupler 45 is rotated on the axis thereof forwardly or reversely, this forward or reverse rotation is transferred to the gearing ring 46.

On the other hand, once the cam body 475 is rotated by a rotation of the gearing ring 46 in the rotational direction opposite to the previous rotational direction, the hollow-cylindrical rotary output shaft 473 rotates due to the engagement of the inner gear 461 with the gear G1, and this rotation of the hollow-cylindrical rotary output shaft 473 causes each peripheral surface roller 478a to be disengaged from the associated one of the wedge-shaped opposite ends in the associated accommodation space to thereby be allowed to rotate freely. Consequently, the wedging effect by the plurality of peripheral surface rollers 478a is cancelled, so that the hollow-cylindrical rotary output shaft 473 comes into a state where it rotates at idle around the cam body 475, which prevents rotation of the hollow-cylindrical rotary output shaft 473 being transferred to the cam body 475. Therefore, even if the gear G1 rotates, only the inner gear 461, i.e., only the hollow-cylindrical rotary output shaft 473 rotates, so that the cam body 475, i.e., the gear G2 does not rotate, and accordingly, the lens-side AF coupler 45 that is integral with gear G3 does not rotate. This is also true for the case where the hollow-cylindrical rotary output shaft 473 is rotated in either rotational direction.

According to the above described AF mechanism, driving the DC motor in the camera body 3 to perform AF control in the camera body 3 causes the body-side AF coupler 35 to rotate on the axis thereof by rotation of the DC motor, thus causing the lens-side AF coupler 45 that is coupled to the body-side AF coupler 35 to rotate integrally with the body-side AF coupler 35. This rotation of the lens-side AF coupler 45 on the axis thereof causes the gearing ring 46 to rotate via the operation of the quick focus clutch 47, thus causing the focusing lens group in the interchangeable lens 4 to move in the optical axis direction to perform a focusing operation. In this operation, although the circular-arc-shaped multi-polar magnet 1B, constituting a mover of the rotary actuator 48, is rotated with the gearing ring 46, this rotation of the circular-arc-shaped multi-polar magnet 1B imposes no load on the rotation of the gearing ring 46 when the gearing ring 46 rotates since the multi-polar magnet 1B is in noncontact with the coil body 2B, that serves as a stator, and also since no magnetic force occurs between the multi-polar magnet 1B and the coil body 2B because no current is passed through the coil body 2B, which makes smooth operation of the gearing ring 46 possible.

On the other hand, in the case where AF control is performed by driving the rotary actuator 48 of the interchangeable lens 4, an AF control signal output from the camera body 3 is input to the rotary actuator 48, and thereupon, the passage of current through the coil body 2B as a stator is commenced. Consequently, the multi-polar magnet 1B rotates by a required angle of rotation by controlled currents. This rotation of the multi-polar magnet 1B causes the gearing ring 46 that is integral with the multi-polar magnet 1B to rotate, thus causing the focusing lens group to move in the optical axis direction to perform a focusing operation. In this operation, the lens-side AF coupler 45 is not rotated due to the torque transmission prevention function of the quick focus clutch 47. Accordingly, no torque is transmitted to the DC motor in a stop state via the body-side AF coupler 35, so that no rotation of the DC motor exert loads on the rotary actuator 48.

When the focus ring 42 of the interchangeable lens 4 is manually operated, the gearing ring 46 that is integral with the focus ring 42 rotates, which causes the focusing lens group to move in the optical axis direction, so that a manual focusing operation is possible. In this case also, the lens-side AF coupler 45 is not rotated due to the torque transmission prevention function of the quick focus clutch 47, i.e., is in a state of being disconnected from the DC motor of the camera body 3, so that a manual focusing operation is possible. In this manner, by the adoption of the rotary actuator in an AF mechanism of the photographic lens, the AF mechanism can be made compact and lightweight, thus making it possible to achieve miniaturization and a weight reduction of the photographic lens.

Figure 12A:
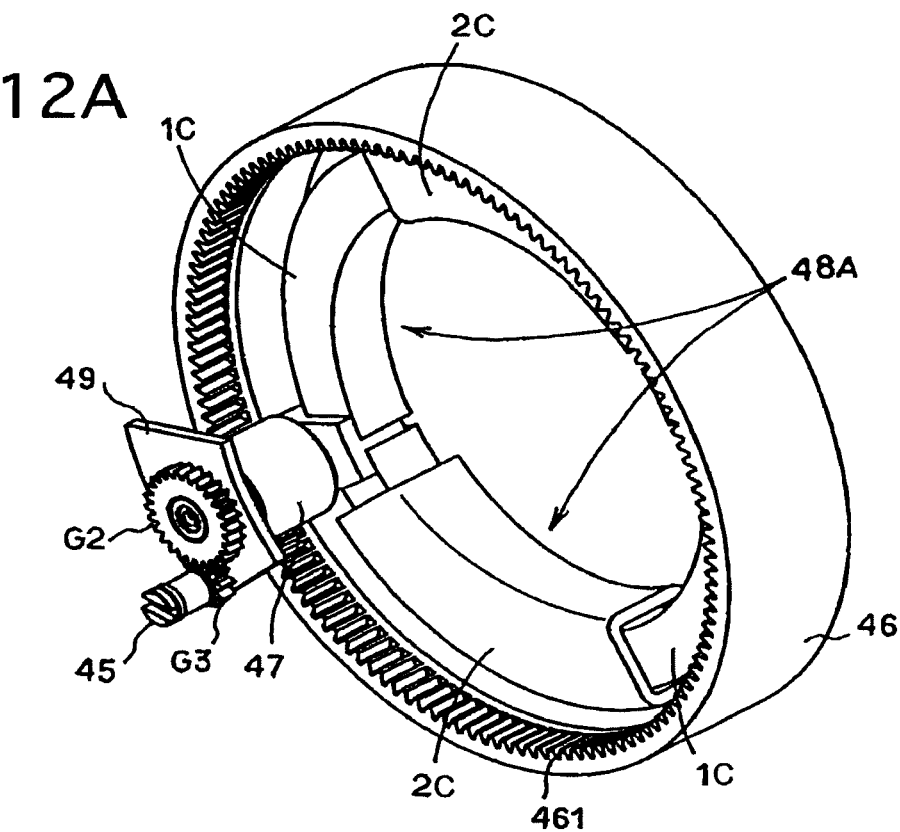
FIGS. 12A and 12B are views similar to those of FIGS. 10A and 10B, respectively, showing a modified embodiment of the AF mechanism of the interchangeable lens shown in FIG. 9B.
Figure 12B:
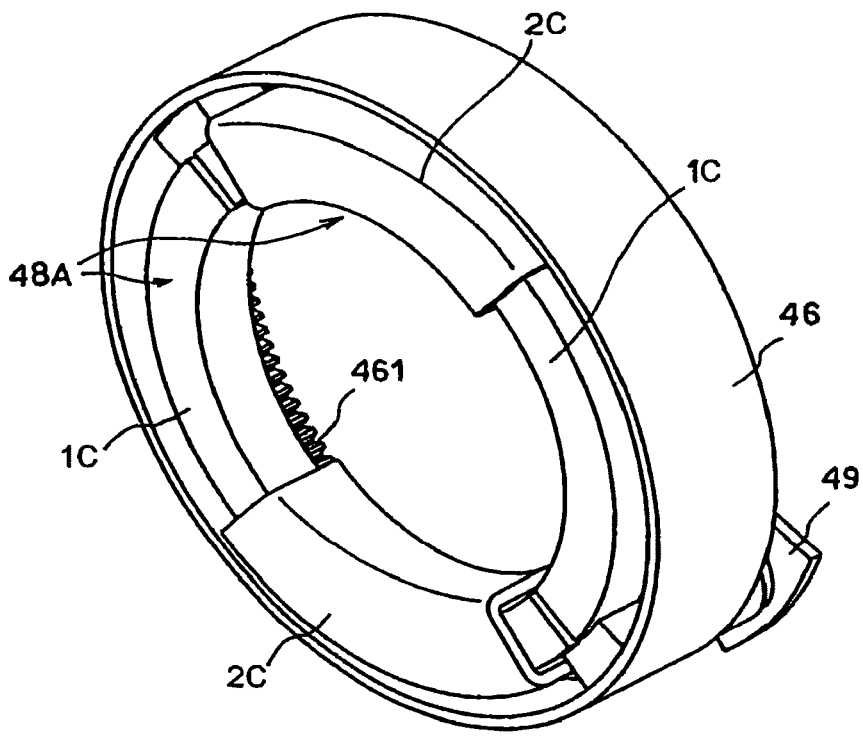

As shown in FIGS. 12A and 12B that show a rear perspective view and a front perspective view of a modified embodiment of the AF mechanism of the interchangeable lens shown in FIG. 9B (constituting a rotation actuator adapted to the AF mechanism of the interchangeable lens shown in FIG. 9B), it is possible for two rotary actuators 48A, each of which is composed of a circular-arc-shaped multi-polar magnet 1C which extends at a substantially 180 degree angle and a coil body 2C, to be arranged point-symmetrically and for two multi-polar magnets 1C be installed integrally to the gearing ring 46.

Hence, incorporating the two rotary actuators 48A into the AF mechanism in this manner makes a high-speed operation of the gearing ring 46 possible, i.e., makes it possible to speed up AF control.

Furthermore, if one of the two coil bodies 2C is shifted from the 180 degree position thereof by half a pitch, i.e., with respect to the point-symmetrical positions thereof described above, the driving pitch of the actuator can be halved, resulting in a more precise (finer) rotational capability while providing an increased amount of torque when current is passed through the coils 21.

In the present invention, as a rotation actuator adapted to the AF mechanism of the interchangeable lens shown in FIG. 9B, it is possible for a multi-polar magnet 1 (1A, 1B or 1C) to be fixed to a stationary member of the interchangeable lens to serve as a stator while each coil body 2 (2A, 2B or 2C) be coupled to the gearing ring 46 to serve as a mover. In addition, the rotary actuator according to the present invention can be not only applied to an AF mechanism of the interchangeable lens 4 shown in FIG. 9B, but also be incorporated in various other devices as a rotary drive source.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A rotary actuator comprising:
   a multi-polar magnet, in which north and south poles are alternately arranged in a circumferential direction, said multi-polar magnet being shaped into one of a circular ring and a circular arc member; and
   a coil body having coils which are provided around said multi-polar magnet to be capable of moving in said circumferential direction of said multi-polar magnet, each of said coils substantially lying on a plane that extends in a radial direction of said multi-polar magnet and that is orthogonal to said circumferential direction of said multi-polar magnet,
   wherein said north and south poles of said multi-polar magnet are positioned apart from each other by a first predetermined interval in said circumferential direction,
   said coils are positioned apart from each other by a second predetermined interval in said circumferential direction, said first predetermined interval being an integer multiple of said second predetermined interval,
   said rotary actuator is applied to a focusing mechanism of a photographic lens of a camera system,
   one of said coil body and said multi-polar magnet is fixed to said photographic lens,
   the other of said coil body and said multi-polar magnet is provided on a gearing ring which is geared to a focus ring of said photographic lens, such that manually rotating said focus ring causes said gearing ring to rotate, and
   an auto focusing operation of said photographic lens is controlled by passing currents through said coils.

2. The rotary actuator according to claim 1, wherein said multi-polar magnet comprises a plurality of arc-shaped permanent magnets which are arranged in said circumferential direction to be formed into one of said circular ring and said circular arc member so that same poles of adjacent permanent magnets of said plurality of permanent magnets are circumferentially opposed, and
   wherein said plurality of arc-shaped permanent magnets are held integrally by a holder.

3. The rotary actuator according to claim 1, wherein said multi-polar magnet comprises an isotropic magnetic material having one of said circular ring shape and said circular arc shape which is magnetized to form north and south poles arranged alternately in said circumferential direction.

4. The rotary actuator according to claim 1, wherein said coil body comprises first, second and third coils which are arranged in said circumferential direction.

5. The rotary actuator according to claim 4, wherein said first, second and third coils are connected in one of a Y-connection and a delta connection.

6. The rotary actuator according to claim 1, wherein said coil body comprises at least two combinations of first, second and third coils which are arranged in said circumferential direction.

7. The rotary actuator according to 4, wherein lengths of said first, second and third coils are mutually identical in said circumferential direction, and
   wherein said first, second and third coils are arranged in said circumferential direction at intervals each of which is substantially equal to one third of said each interval between each of said north and south poles of said multi-polar magnet.

8. The rotary actuator according to 6, wherein lengths of said first, second and third coils are mutually identical in said circumferential direction, and
   wherein said first, second and third coils are arranged in said circumferential direction at equal intervals which are substantially equal to one third of said predetermined interval between said north and south poles of said multi-polar magnet.

9. The rotary actuator according to claim 6, wherein said first, second and third coils are connected in one of a Y-connection and a delta connection.

10. The rotary actuator according to claim 1, wherein one and the other of said multi-polar magnet and said coil body are configured to serve as one and the other of a stator and a mover.

11. The rotary actuator according to claim 1, wherein said camera system is configured so that a lens-side coupler of said photographic lens and a body-side coupler of a camera body of said camera system are coupled to each other when said photographic lens is attached to said camera body and that torque of a motor incorporated in said camera body is transmitted to said gearing ring via said lens-side coupler and said body-side coupler, and
   wherein said gearing ring is coupled to said lens-side coupler via said body-side coupler, and
   wherein a one-way clutch that is provided in said photographic lens transmits torque only in a direction from said lens-side coupler toward said gearing ring.

12. The rotary actuator according to claim 1, wherein the coil body and the multi-polar magnet are provided around a lens frame in which a lens group is supported.

13. The rotary actuator according to claim 1, wherein the coil body and the multi-polar magnet are coaxially arranged with the focus ring.

* * * * *